United States Patent [19]
Cassou et al.

[11] Patent Number: 4,821,490
[45] Date of Patent: Apr. 18, 1989

[54] METHOD OF AND APPARATUS FOR CLOSING THE END OF A PAILLETTE

[76] Inventors: Robert Cassou, Rue Clemenceau, 61300 L'Aigle; Bertrand Cassou, Saint Symphorien des Bruyeres; Maurice Cassou, Rue Clemenceau, 61300 L'Aigle, all of France

[21] Appl. No.: 515

[22] Filed: Jan. 5, 1987

[30] Foreign Application Priority Data

Jan. 10, 1986 [FR] France ................. 86 00273

[51] Int. Cl.⁴ ............... A61M 37/02; A61D 7/02; B29C 57/10; B65B 7/28
[52] U.S. Cl. ........................ 53/423; 53/488; 215/233
[58] Field of Search .............. 53/476, 478, 484, 487, 53/488, 423; 264/267, 296; 215/233, 355

[56] References Cited

U.S. PATENT DOCUMENTS 2,338,102  1/1944  Fields ..................... 53/488 X
3,874,430  4/1975  Wieder .
4,576,284  3/1986  Wittwer et al. ............. 215/233 X

FOREIGN PATENT DOCUMENTS 2010447  2/1970  France .
1275051  5/1972  United Kingdom .

OTHER PUBLICATIONS

French Search Report dated 01/10/86, 86 00273.

Primary Examiner—James F. Coan
Assistant Examiner—Steven P. Weihrouch
Attorney, Agent, or Firm—Andrus, Sceales, Starke & Sawall

[57] ABSTRACT

This invention relates to closing an open end of a paillette containing a biological element. The invention includes heating a dose of thermo-plastic material to a flowable condition and injecting the dose into the cold open end of the paillettes so that the material adheres to the inner wall of the paillette and solidifies to form a stable plug closing the end. The thermo-plastic material is preferably in the form of solid sticks. A valve in closing apparatus opens and closes communication with a reservoir containing the thermo-plastic material under pressure and defines a pre-determined volume for the dose. The invention is especially applicable to the production of paillettes for use in artificial insemination.

3 Claims, 2 Drawing Sheets

4,821,490

METHOD OF AND APPARATUS FOR CLOSING THE END OF A PAILLETTE

BACKGROUND OF THE INVENTION

This invention relates to paillettes, that is to say long thin tubes which are used in artificial ensemination, especially. These tubes are plugged at one end and are then filled by introducing a biological element or substance, such as animal semen, an embryo or even viruses. This produces paillettes which are hermetically sealed at one end and filled with the desired biological element or substance and the other end of the paillette has then to be closed. The paillette will then be ready for use and may be stored in the meantime at very low temperature, for example, in liquid nitrogen.

DESCRIPTION OF THE PRIOR ART

The closure operation has been performed by ultrasonic welding and alternatively by hot welding using a polyvinyl adhesive powder. These techniques may cause deterioration of the product contained in the paillette, the heat from hot welding the end of the paillette can damage the product. Ultrasonic welding avoids heating the product but the vibrations created may themselves cause deterioration of the product. Thus, for example, in the case of embryos, it is prefered to trap the embryo in the paillette between two air bubbles which form cushions avoiding bursting of the embryo during unfreezing, but the ultrasonic vibrations used in welding break up these air bubbles.

OBJECT OF THE INVENTION

It is an object of the invention to provide a method of and apparatus for closing the end of a paillette while avoiding the disavantages of the prior art.

More particularly, it is an object of the invention to provide a closure technique which is simple and effective and avoids damaging the product in the paillette.

Specifically, an object of the invention is to close the paillette end without applying heat or ultrasonic vibrations to the product in the paillette.

SUMMARY OF THE INVENTION

One aspect of the present invention provides a method of closing an open end of a paillette comprising a tube containing a biological substance, comprising heating at least a dose of thermo-plastic material to a flowable condition and injecting said dose under pressure into the cold open end of the paillette so that the material adheres to the wall of the paillette and solidifies to form a stable hermectic plug closing the end.

This closure method applies to the product in the paillette only a compression which may be absorbed by the air at the entry of the paillette which is trapped and compressed by the plug of thermo-plastic material entering the paillette. This improves the support of the product and, in the case of an embryo, reinforces the support between two air bubbles. The plug adheres well to the inner wall of the paillette due to the temperature of the thermoplastic material, its flowable condition and its pressure and the plug seal resists well the very low temperatures used in conservation by freezing. Also this technique enables problems due to possible pollutant deposits on the inner wall of the paillette to be avoided.

Preferably the dose injected is heated to more than 100° C.: this adds a useful sterilising effect.

Advantageously, said paillette comprises a tube of polyvinyl chloride and said thermo-plastic material comprises a solid mixture of ethylene-vinyl-acetate copolymer and a polyolefine.

The characteristics and melting point of this adhesive mixture are well suited to use with polyvinyl chloride. Also, this mixture is conveniently available commercially in the form of semi-rigid solid sticks for use in adhesive guns.

This invention also includes a paillette whose open end is closed by a method as described above.

Another aspect of the invention provides apparatus for closing an open end of a paillette comprising a tube containing a biological substance, said apparatus comprising a reservoir for containing a plurality of doses of thermo-plastic material, heater means for heating at least part of said thermo-plastic material in said reservoir to a flowable condition, guide means for receiving the cold-open end of the paillette and defining a channel through which a dose of heated thermo-plastic material may be injected into the cold open end, valve means displaceable to an open position in which said channel communicates with said reservoir and a closed position in which the communication is interrupted, and pressure means for applying pressure to said reservoir, whereby to inject a dose of said thermo-plastic material into said open end when said valve means is in said open condition.

When the valve means is moved to its open position, the reservoir communicates with the paillette through the valve and the guide means and the heated dose of thermo-plastic material is injected into the open end of the paillette under pressure. The valve means may then be closed to interrupt the communication with the paillette and the dose of thermo-plastic material in the paillette solidifies to form a hermetic seal.

The structure of the apparatus may be very simple and any suitable source of energy may be used. The closure operation is actuated by mechanical means and may readily be performed by an unskilled person.

The heater means may be autonomous; for example, the heater means may include a combustion heater fueled by methylated spirits. Alternatively, the heater means may comprise electrical resistors supplied by an autonomous electrical power source, such as a battery or accumulator.

In an embodiment of the invention, said valve means present a stem defining a central channel which is aligned with said channel in said guide means, said central channel communicating with said reservoir in said open position of said valve means and being closed in said closed position.

Preferably, said reservoir is shaped and dimensioned to receive at least one piece of said thermo-plastic material in a solid condition. Advantageously, said heater means is disposed and arranged to heat selectively thermo-plastic material in a front part of said reservoir, adjacent to the communication with said guide means. In a preferred embodiment, said reservoir presents a funnel shaped portion in said front part whereby to reduce the volume and cross-section of heated thermo-plastic material. The reduction in cross-section of the thermo-plastic material increases the pressure in the front part of the reservoir.

In accordance with a preferred embodiment of the invention, movement of said valve means from said closed position to said open position predetermines the volume of a dose of said thermo-plastic material to be injected. Preferably, said reservoir includes a body forming a wall of the reservoir, said valve presenting a head mounted in said body for axial sliding movement between said open and closed positions, said head defining a side-port which is closed by said body in said closed position and which is uncovered from said body to communicate with the interior of said reservoir in said open position, said head penetrating into said reservoir as it moves towards said open position whereby to displace a pre-determined volume of said thermo-plastic material against the pressure of said pressure means, whereby to define said dose. Advantageously, said head presents a pointed shape, whereby to penetrate readily said thermoplastic material in said flowable condition. Conveniently, the heater means is disposed in said body.

In an embodiment of the invention, said pressure means comprises a spring biased piston mounted slidingly for movement in a direction aligned in opposition to movement of said valve means from said closed position to said open position; this structure is especially simple to make.

DESCRIPTION OF THE DRAWINGS

Other features and advantages of the invention will appear from the following description, given by way of example, with reference to the accompanying drawings, in which.

DESCRIPTION OF PREFERRED EMBODIMENT

Figure 1:
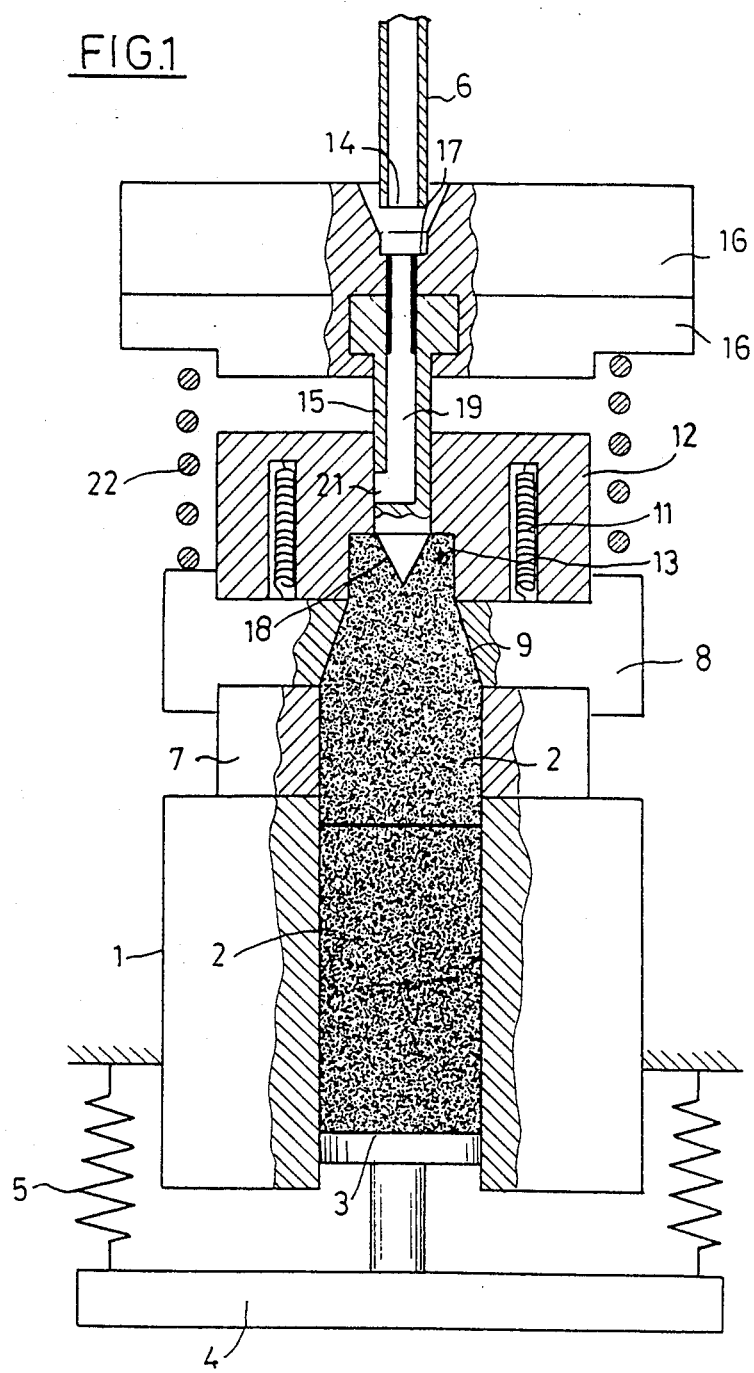
FIG. 1 is a diagrammatic sectional view of an apparatus in accordance with the invention in a rest position and, FIG. 2 is a partial diagrammatic sectional view of the apparatus in an actuated position.

The apparatus shown in the drawings is used in a preferred method of closing a paillette which comprises moulding a thermo-plastic material into the walls of the paillette without causing deformation of the shape of the paillette, which is particularly important for use of the paillettes in automatic machines, for example. The process comprises heating the thermo-plastic material to a flowable state, injecting the material under pressure into an end of the paillette to form a plug, and allowing the plug to cool and solidify. The thermo-plastic material is chosen to have good adhesion with the material of the inner wall of the paillette so that it adheres thereto before solidifying so as to ensure that the plug is sealed. The heat of the plug is applied to the inside of the paillette and the temperature may be relatively low, so that there is no deformation of the outside surface of that end of the paillette.

The plug is 3 to 5 mm long, for example which is sufficient to ensure complete sealing of paillettes having diameters up to 6 mm; the thermo-plastic material used is chosen to be strong enough to resist high pressure which can be experienced in the vicinity of the paillette during its subsequent use; the thermo-plastic material is also chosen to resist freezing and unfreezing treatment without losing its mechanical properties.

If the molten temperature of the thermo-plastic material is higher than 100° C., the closure operation is accompanied by a simultaneous sterilisation operation which is particularly important for paillettes containing biological products or substances. Also, the fact that the thermo-plastic material adheres immediately to the inner wall of the paillette avoids problems which could be produced by surface pollutant deposit.

By way of exemple, if the paillette is made of polyvinyl chloride which is necessarily of alimentary quality given the products contained in the paillette, the thermo-plastic material may consist of a suitable thermo-plastic adhesive in the form of a stick, as used in an adhesive gun; an adhesive consisting of a mixture of E.V.A. (Ethylene-vinyl-acetate co-polymer) and of polyolefine is an example of a suitable adhesive.

When the thermo-plastic material is introduced into the paillette, the air in the end to be closed is trapped and compressed; this volume of air has an advantage in that it forms a damper or cushion and improves the securing of the product contained in the paillette without risk of deteriorating nor changing it.

Figure 2:
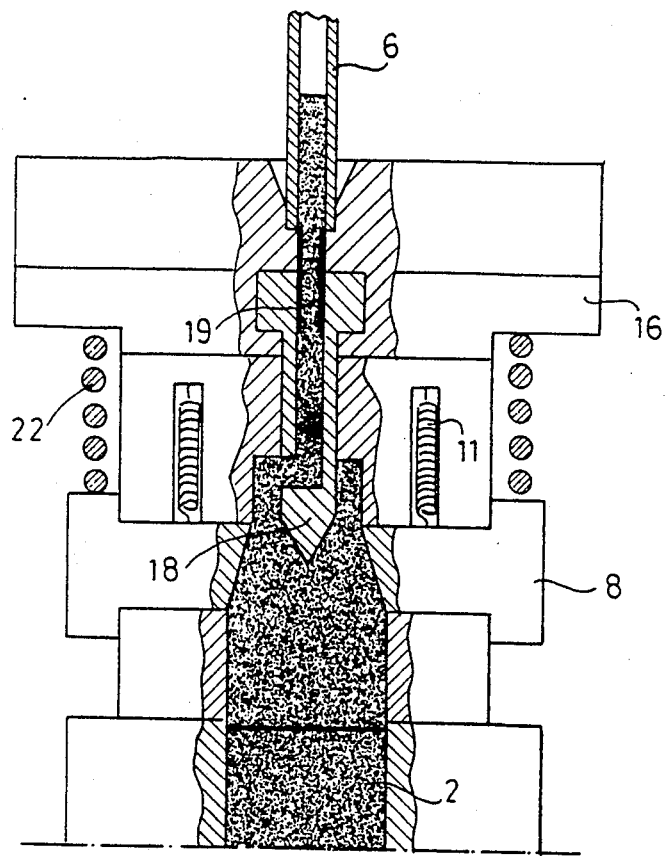

FIGS. 1 and 2 show the apparatus used in a rest position and in an actuated position respectively. The apparatus uses sticks of thermo-plastic material and comprises a cylindrical reservoir 1 which can contain a plurality of sticks 2 places end-to-end in axial alignment. The reservoir 1 is made of metal, for example. The rear face 3 of the set of sticks 2 is sujected to a pressure of the order of 0.7 MPa (7kg/cm$^2$), for example, applied by pressure means comprising in this embodiment, a piston 4 engaging in the rear of the reservoir 1 and urged into the reservoir by tension spring 5 whose other ends are solid with the reservoir.

A heater is disposed adjacent the front end of the stick 2 or alternatively covering a substantial length of the sticks 2 so as to heat at least the zone of the stick 2 adjacent the front end and bring it to a flowable condition. The apparatus also presents a guide for receiving the end of the paillette to be closed; the guide is moveable in translation parallel to the axis of the stick reservoir between two positions: in an actuating position shown in FIG. 2, the end of the paillette 6 communicates with the front end of the stick which is flowable; in a second, rest position which is shown in FIG. 2, this communication is interrupted.

Between the reservoir 1 and the heater, a connector 7 is provided, made of low heat-conductive material, for example Teflon (Registered Trade Mark). The connector 7 presents an internal duct extending the channel in the reservoir body and is itself extended by an intermediate member 8 presenting a cone-shaped internal duct 9 forming a funnel into which the thermo-plastic material is pressed and which reduces the sectional area of the material. The intermediate member 8 advantageously forms part of the heater together with a heater element 12 including electric resistances 11 buried therein. The heater element 12 also forms a valve body, as described below, for a valve mounted therein.

The communication between the end of the paillette and the stick front face 13, which is heated to a plastic flowable condition by the heater described above, is obtained through a valve 15 which is solid with a guide member 16 in which is formed a recess 17 for receiving and guiding the end 14 of the paillette 6. The valve 15 is mounted slidingly in the central duct of the heater element 12; the free end 18 of the valve 15 is pointed so as to penetrate readily into the soft end 13 of the thermoplastic stick. An axial channel 19 is formed in the stem of the valve 15; this channel connects at one end with the recess 17 for the paillette end 14 through a nozzle 20 and the other end of the channel opens through a lateral opening 21 in the cylindrical side wall of the valve stem 15. A compression spring 22 is disposed between the guide member 16 and the reservoir 12 to urge them towards the relative positions of the rest condition of the apparatus (FIG. 1).

The operation of the apparatus is as follows. The heater element, comprising the electrical resistances 11 in this embodiment is energised permanently so as to soften the stick front end which enables it to be funnelled into the cone of the intermediate piece 8, so as to reduce its section. In the rest position shown in FIG. 1, the semi-fluid end 13 of the stick 2 is blocked by the end 18 of the valve 15.

To close the end of a paillette 6, the end 14 to be closed is placed in the recess 17 and the paillette 6 and guide member 16 are pressed down together against the return spring 22 so as to reach the actuated position shown in FIG. 2. The valve 15 slides in the duct of the heater element 12, forming the valve body and its pointed end enables it to penetrate readily into the soft end of the thermo-plastic material. As it reaches the actuated position, the valve uncovers the lateral opening 21 from the valve body formed by the heater element 12 and this establishes communication between the paillette 6 and the end of the stick 13 so that a predetermined dose of thermo-plastic material penetrates into the end 14 of the paillette.

This dose is displaced by the pressure exerted by the piston 4, which had been displaced a pre-determined amount by the penetration of the valve end 18 into the reservoir 1. The dosed thermo-plastic material injected into the paillette cools and solidifies immediately after having contacted and adhered to the inner wall of the paillette, terminating the formation of the plug.

It will be noted that the hot part of the apparatus is well-defined and spaced from the paillette so that the paillette is only subjected to the small amount of heat from the thermo-plastic material. Thus, the heater element 12 with its resistances is separated from the paillette by the two parts of the guide member 16 in one of which the recess for receiving the paillette is formed and the valve 15. On the other side, the thermal insulation is provided by the connector 7 and, especially if the connector is made of Teflon (Registraded Trade Mark), it has a high thermal inertia so that the thermo-plastic material in the metal reservoir 2 is cold and in a semi-rigid condition. It will be appreciated that the apparatus of the embodiment of the invention is particularly simple, that it can be operated by a non-specialist operator and that it is sufficient to press the guide member down against the pressure of the spring 22 to achieve closure of the paillette.

The apparatus may be arranged to be completely autonomous, which enables its use in any suitable place and, in particular, in places where no external source of energy is available; this is particularly important in the case of utilisation in the animal husbandry industries. The heater may readily be made autonomous by using an electric battery or accumulator to supply the electrical resistances 11. In a variant, the heater may comprise a combustion apparatus running on methylated spirits, for example.

This embodiment of the invention enables closure of the second end of paillettes whose length is about 133 mm and whose internal volume is between 0.25 and 1 cm$^3$, for example. As mentioned above, the apparatus is usable with paillettes whose inner diameter is up to 6mm.

We claim:

1. A method of closing an open end of a paillette, said paillette being formed as tube containing a biological substance and being suitable for the low temperature storage of such substances, said method comprising the steps of:
   providing a paillette comprising a tube of polyvinyl chloride having an open end;
   heating a dose of thermo-plastic material to a flowable condition, said thermo-plastic material comprising a solid mixture of ethylene-vinyl-acetate copolymer and a polyolefine;
   injecting the dose under pressure into the open end of the paillette; and
   allowing the material to solidify and adhere to the wall of the paillette to form a stable hermetic plug closing the end of the paillette.

2. A method as claimed in claim 1 wherein the heating step is further defined as heating the dose to a temperature of more than 100° C.

3. A paillette suitable for the low temperature storage of biological substances and comprising:
   a tube containing the biological substance, said tube being formed of polyvinyl chloride and having an end; and
   a stable hermetic plug of flowable thermo-plastic material injected into said end of said tube and adhering to the wall thereof for closing said tube, said thermo-plastic material comprising a solid mixture of ethylene-vinyl-acetate copolymer and a polyolefine.

* * * * *